United States Patent
Ha et al.

(10) Patent No.: US 7,948,833 B2
(45) Date of Patent: May 24, 2011

(54) CLOCK SETUP OVER A NETWORK

(75) Inventors: Wai-leung Ha, Pokfulam (HK); Kairy Kai Lei, Shen Zhen (CN)

(73) Assignee: Computime, Ltd., Honk Kong (HK)

( * ) Notice: Subject to any disclaimer, the term of this patent is extended or adjusted under 35 U.S.C. 154(b) by 81 days.

(21) Appl. No.: 11/782,911

(22) Filed: Jul. 25, 2007

(65) Prior Publication Data
US 2009/0028006 A1    Jan. 29, 2009

(51) Int. Cl.
G04C 11/02    (2006.01)
(52) U.S. Cl. .......................................................... 368/47
(58) Field of Classification Search .................... 368/46; 370/519, 352, 349, 389, 114; 386/66; 709/248; 342/357.02, 357.15
See application file for complete search history.

(56) References Cited

U.S. PATENT DOCUMENTS

| | | | |
|---|---|---|---|
| 5,386,542 A * | 1/1995 | Brann et al. | 709/248 |
| 5,408,506 A * | 4/1995 | Mincher et al. | 375/134 |
| 6,107,818 A * | 8/2000 | Czamara | 324/765 |
| 6,512,761 B1 * | 1/2003 | Schuster et al. | 370/352 |
| 6,665,316 B1 * | 12/2003 | Eidson | 370/509 |
| 7,084,742 B2 | 8/2006 | Haines | |
| 7,151,968 B2 | 12/2006 | Williamson | |
| 2004/0125824 A1 * | 7/2004 | Preston et al. | 370/519 |
| 2004/0133455 A1 | 7/2004 | McMahon | |
| 2004/0138517 A1 | 7/2004 | Osorio et al. | |
| 2004/0223515 A1 * | 11/2004 | Rygielski et al. | 370/503 |
| 2004/0249982 A1 * | 12/2004 | Arnold et al. | 709/248 |
| 2004/0264302 A1 | 12/2004 | Ward, II | |
| 2005/0085259 A1 | 4/2005 | Conner et al. | |
| 2005/0195862 A1 * | 9/2005 | Jones et al. | 370/503 |
| 2006/0238415 A1 * | 10/2006 | Gilkes | 342/357.02 |
| 2006/0245454 A1 * | 11/2006 | Balasubramanian et al. | 370/509 |
| 2008/0187282 A1 * | 8/2008 | Brady et al. | 386/66 |

FOREIGN PATENT DOCUMENTS

| | | |
|---|---|---|
| CN | 1716949 A | 1/2006 |
| CN | 1866814 A | 11/2006 |
| WO | 2005077063 A2 | 8/2005 |

OTHER PUBLICATIONS

International Search Report for PCT/CN2008/071730, dated Oct. 30, 2008, pp. 1-3.

* cited by examiner

*Primary Examiner* — Edwin A. Leon
(74) *Attorney, Agent, or Firm* — Banner & Witcoff, Ltd.

(57) ABSTRACT

The present invention provides apparatuses and methods for updating a target device from a clock device through a network. The clock device obtains a time value from a clock source and sends the time value to a target device. A node within the network determines a time delay, adjusts the time value in accordance with the time delay, and sends the adjusted time value to the target device. The node may determine a time delay from an internal timer or from a measurement message when adjusting the time value. The clock device may send a subsequent time update message to the target device if the target device does not acknowledge reception of a time update. The clock device may also send a time update message to a target device when a status change of daylight savings time occurs and obtain a subsequent time value from a clock source.

28 Claims, 6 Drawing Sheets

CLOCK SETUP OVER A NETWORK

FIELD OF THE INVENTION

The present invention relates generally to updating a real time clock of a device through a network.

BACKGROUND OF THE INVENTION

A radio clock (commonly referred as an atomic clock) acquires time and date signal from a radio station, e.g., WWV radio station that is located in Colorado. Such information may be very useful for clock and time setup of home appliances such as a video cassette recorder (VCR), digital video disc (DVD) recorder, and personal video recorder (PVR) that often depend on time and date for proper operation. However, adding a radio clock to each home or office appliance may increase the complexity of the appliance.

SUMMARY OF THE INVENTION

The present invention provides systems, methods, and apparatuses for updating a target device from a clock device through a network.

With one aspect of the invention, a clock device obtains a time value from a clock source and sends the time value to a target device of a network. A node in the network determines a time delay, adjusts the time value in accordance with the time delay, and sends the adjusted time value to the target device. A subsequent node may further adjust the adjusted time value if further network delay is incurred.

With another aspect of the invention, a target device obtains an adjusted time value from a message through the network and synchronizes an internal clock to the adjusted time value.

With another aspect of the invention, a time update message includes an indicator that is indicative of a real time update. The time update message includes a time value that a target device synchronizes to.

With another aspect of the invention, a node in the network determines a time delay from an internal timer.

With another aspect of the invention, a node in the network determines a time delay from a measurement message before sending a time update message.

With another aspect of the invention, a clock device obtains a time value from a clock source and sends a time update message to a target device when the target device requests for a time update.

With another aspect of the invention, a clock device may send a subsequent time update message to a target device if the target device does not acknowledge reception of the previous clock update message.

With another aspect of the invention, a clock device sends a time update message to a target device when a status change of daylight savings time occurs. The clock device may obtain a subsequent time value from a clock source and send a subsequent time update message if the target device does not confirm the time update.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION OF INVENTION

Figure 1:
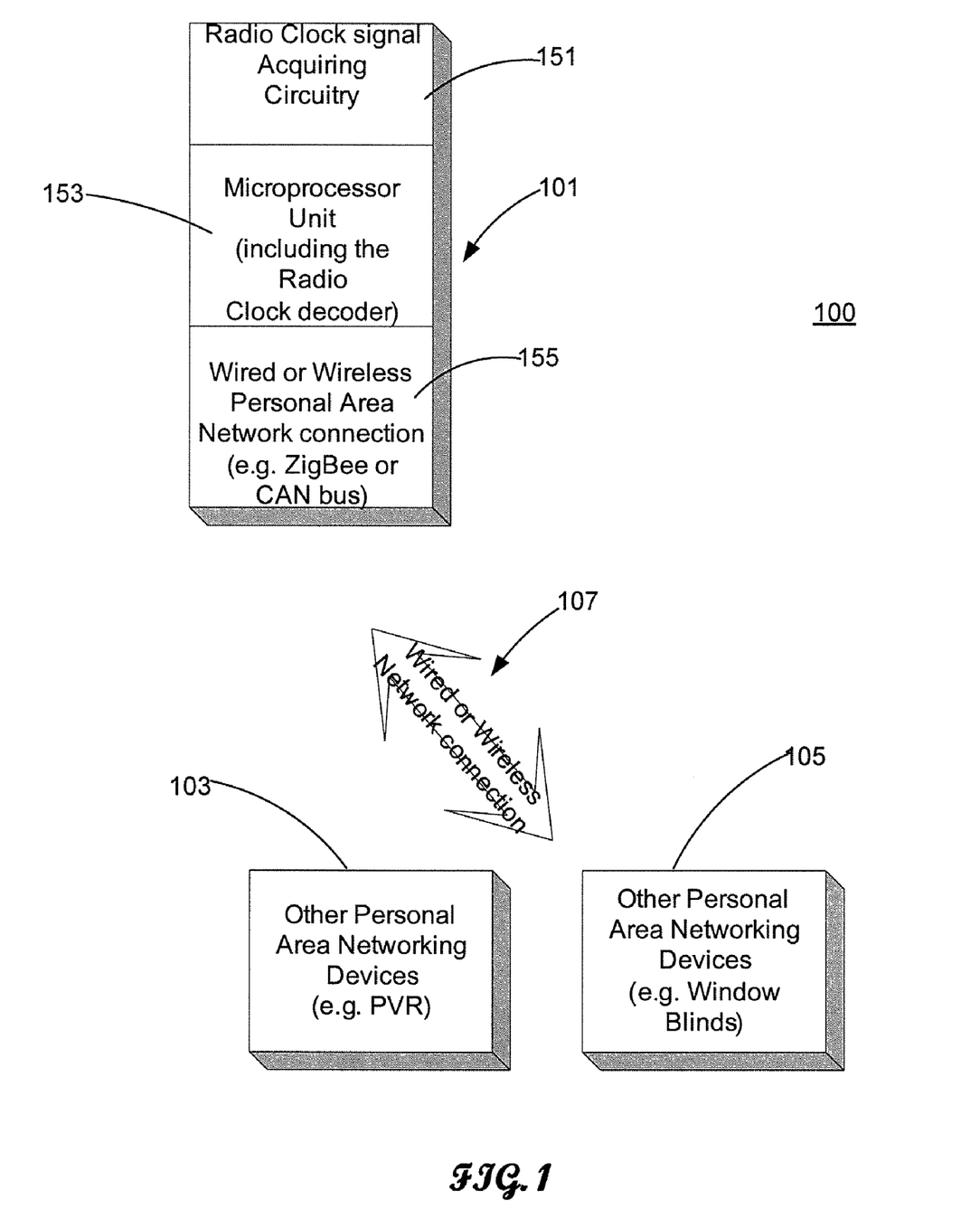
FIG. 1 shows a system for configuring a target device from a clock device over a network in accordance with an embodiment of the invention.

FIG. 1 shows system 100 for configuring a target device 103 or 105 from clock device 101 over network 107 in accordance with an embodiment of the invention. Clock device 101 includes acquiring circuitry 151, microprocessor unit 153 and network interface 155.

Circuitry 151 may acquire a signal contain a time value of the current time from a radio station (e.g., radio station WWV) or an Internet connection (e.g., from Internet services provided by the National Institute of Standards and Technology (NIST)) as will be further discussed.

With embodiments of the invention, microprocessor unit 153 is a low cost microprocessor based device with limited processing power. Microprocessor unit 153 extracts the time value of the current time (within a time resolution of system 100) from a signal received from a radio station or Internet connection. The time provided by the radio station is typically in minutes with a correction up to 0.1 second. Networking delay typically varies from several milliseconds to several seconds, depending on the network connectivity and signal quality. Moreover, microprocessor unit 153 may adjust the time value to compensate for a time duration associated with acquiring the signal and processing the clock information. Microprocessor unit 153 converts clock information that includes the time value of the current time to an appropriate time and date format according the network protocol and stacks supported by network 107. In addition, Microprocessor unit 153 may convert the time value to be in accordance with time zone that the target device is located. (For example, microprocessor unit 153 may have a data structure that is configured with location information for each target device if system 100 spans multiple time zones.) Clock device 101 may support different network protocols including, but not limited to, ZigBee (based on the IEEE 802.15.4 standard), Controller Area Network (CANbus), and IEEE 802.11 g.

Figure 6:
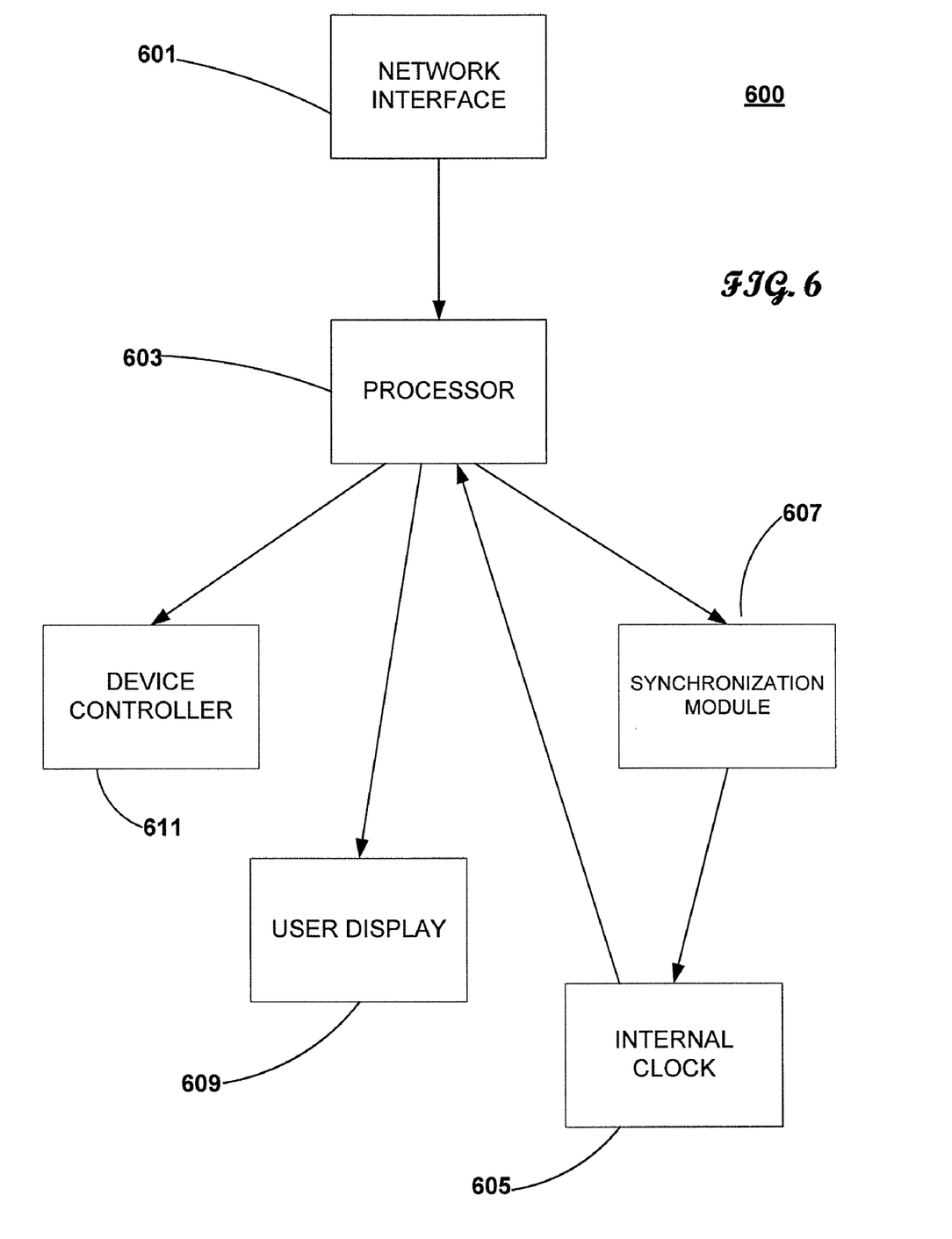
FIG. 6 shows an architecture for a target device that synchronizes an internal clock from clock information in accordance with an embodiment of the invention.

Network interface 155 interfaces to network 107 in order to transfer clock information to target device 103 or 105 through network 107. System 100 may support a variety of different devices including, but not limited to, a personal video recorder 103, window blinds controller 105, home security system 219 (shown in FIG. 2), and DVD recorder 217. Once a target device 103 or 105 obtains the time value, the target device synchronizes an internal timer (e.g. internal clock 605 as shown in FIG. 6).

Network 107 may span different areas, including a home, a group of home, and a multi-location company. Network 107 may support different topologies including star and mesh topologies. Clock information may be transported from one node to another node in order to reach the target device. In such case, a time delay may occur due to a node processing latency. As will be discussed, system 100 may adjust the time value in accordance with the incurred time delays.

Figure 2:
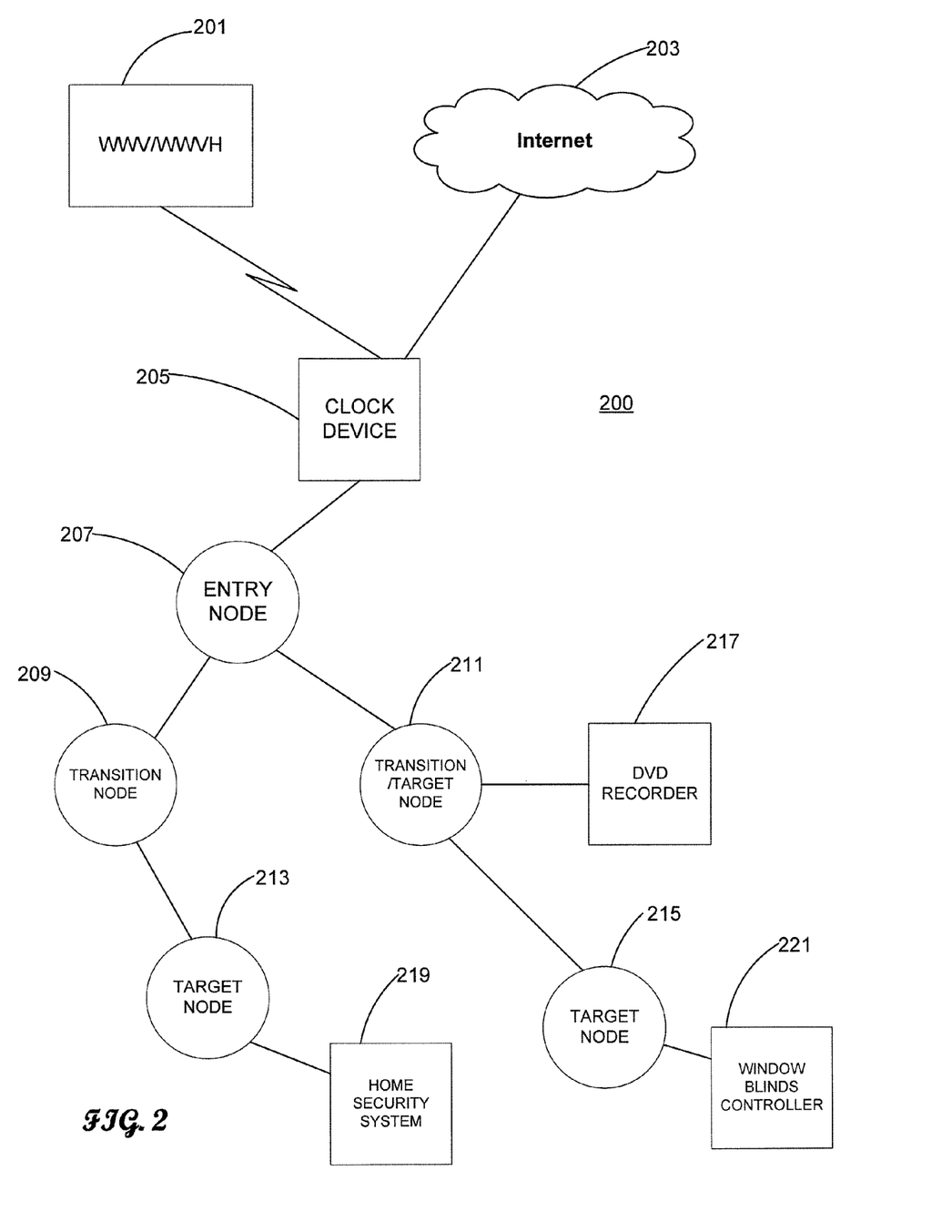
FIG. 2 shows an architecture for configuring a target device from a clock device over a home network in accordance with an embodiment of the invention.

With embodiments of the invention, clock device 101 may periodically obtain time values from the radio station (e.g. radio station 201) or Internet 203 in order to synchronize target devices 103 and 105. Synchronization may be done automatically at a preset interval (e.g., every day, every half-day, or every hour). Clock device 101 may also initiate synchronization for other reasons, including the occurrence of an event. For example, clock device 101 may detect a power outage, and as a result, obtain the time value from radio station 201 to target devices 103 and 105 in order to time synchronize the target devices. Also, target device 103 or 105 may send a request to clock device 101 (by sending a time update message to clock device 101 over network 107) to synchronize the time if an event occurs at the target device. For example, a power outage may occur at the target device or a user may generate an update command by entering a corresponding code through the target device.

Clock device 101 may be programmed to enter a forced synchronization mode so that the time and date acquired from a radio or internet source may be forced to synchronize with all other real time clock devices (e.g., target devices 103 and 105). Clock device 101 is used to synchronize with networked devices that have a built-in real time clock (RTC).

Typically, synchronization is performed through broadcasting, in which clock device 101 sends time information to time all other devices with the RTC function. However, some of the target devices may go into a sleep mode during the broadcasting time. Those target devices may not be able to update their real time clock accordingly. To address this possibility, a target device with the RTC function should be able to ask (request) for synchronization when the target device wakes up from the sleep or idle mode. Consequently, clock device 101 replies by sending a clock update message to the requesting target device.

With embodiments of the invention, clock device 101 maintains a list of the addresses of target devices that support the RTC function. When time synchronization occurs, clock device 101 sends a time update message to target devices that support the RTC function one by one and asks for acknowledgement confirmation. For target devices that do not reply with an acknowledgement, clock device 101 tries periodically to ascertain that the target devices received the clock information.

With embodiments of the invention, clock device 101 supports automatic daylight saving time detection and synchronization. For example, a signal transmitted by radio station WWV includes a DST signal bit, which indicates whether the United States is on Daylight Saving Time. If clock device 101 detects a change of the DST signal bit, clock device 101 enters into the forced synchronization mode to ascertain that target devices supporting the RTC function can be updated to minimize error in DST change-over.

FIG. 2 shows architecture 200 for configuring a target device (e.g., DVD recorder 217, home security system 219, or window blinds controller 221) from a clock device 205 over a home network in accordance with an embodiment of the invention.

With the popularity of home networking, many of the appliances in a home may be connected either through wired or wireless networking. As shown in FIG. 2, clock device 205 interfaces to a home or business control network. Clock device 205 acquires radio clock information either through atmosphere by decoding the RF signal from a radio station (e.g., WWV) 201 or through an Internet connection 203. Clock device 205 then converts clock information (e.g., the time value of the current time) to the network protocol supported by nodes 207-215. As illustrated in FIG. 2, the home network includes nodes 207-215 for supporting messaging from clock device 205 to target devices 217-221.

Figure 4:
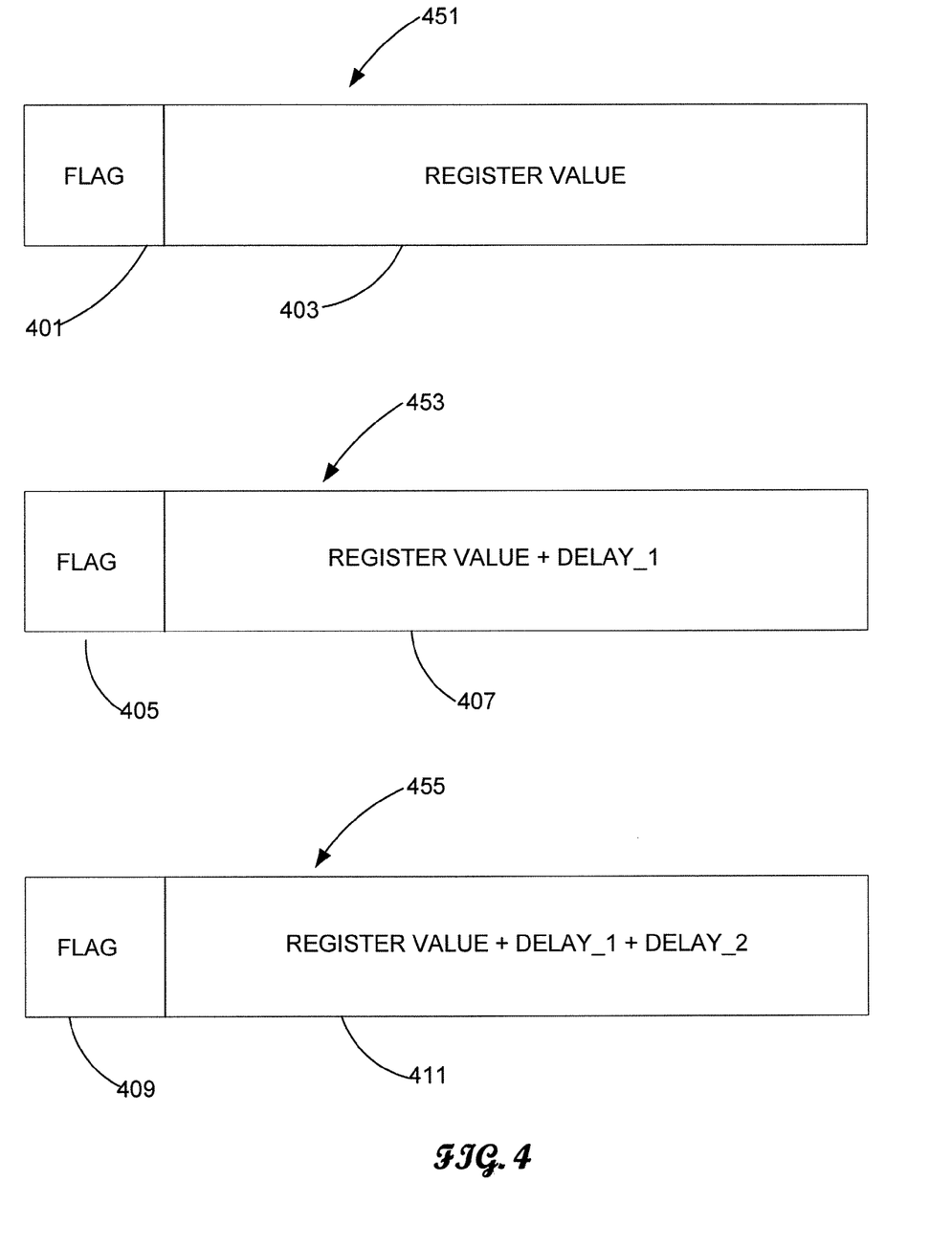
FIG. 4 shows formats of time update messages containing clock information that are transported through a network in accordance with an embodiment of the invention.

As exemplified in FIG. 2, clock device 205 interfaces to the home network through entry node 207. If clock device 205 is time synchronizing DVD recorder 217, clock device 205 sends a time update message (e.g., time update message 451 as shown in FIG. 4 and as will be discussed) to DVD recorder 217 through entry node 207 and target node 211. If clock device 205 is time synchronizing window blinds controller 221, a similar time update message is sent through entry node 207, transition node 211, and target node 215. Similarly, if clock device 205 is time synchronizing home security system 219, a time update message is sent through entry node 207, transition node 209 and target node 213.

Nodes 207-215 may advance clock information to adjust the time value contained in messaging (e.g., time update messages 451-455 as shown in FIG. 4) according to time delays imposes by the node. The time delay may determined by a number of ways in accordance with embodiments of the invention. For example, each node may have an internal timer that measures the time interval between receiving a time update message to sending the time update message to the next node or target device. Alternatively, if the variation of time days is sufficiently small (in relation to the desired time resolution), system 200 may send a separate echo request message a responding "echo response" message between nodes 207-215 to determine time delays associated with each of the nodes.

With embodiments of the invention, a device (e.g., clock device 205 and target devices 217-221) may incorporate the functionality of a node (e.g., nodes 207, 211, 213, and 215, respectively).

The National Institute of Standards and Technology (NIST) provides time services though both radio station WWV 201 and Internet service 203 in accordance with prior art.

NIST radio station WWV broadcasts time and frequency information 24 hours per day, 7 days per week to millions of listeners worldwide. WWV is located in Fort Collins, Colo., about 100 kilometers north of Denver. The broadcast information includes time announcements, standard time intervals, standard frequencies, UT1 time corrections, a BCD time code, geophysical alerts, marine storm warnings, and Global Positioning System (GPS) status reports.

WWV operates in the high frequency (HF) portion of the radio spectrum. The station radiates 10,000 W on 5, 10, and 15 MHz; and 2500 W on 2.5 and 20 MHz. Each frequency is broadcast from a separate transmitter. Although each frequency carries the same information, multiple frequencies are used because the quality of HF reception depends on many factors such as location, time of year, time of day, the frequency being used, and atmospheric and ionospheric propagation conditions. The variety of frequencies makes it likely that at least one frequency will be usable at all times.

The signals broadcast by WWV use double sideband amplitude modulation. The modulation level is 50 percent for the steady tones, 50 percent for the BCD time code, 100 percent for the second pulses and the minute and hour markers, and 75 percent for the voice announcements.

The NIST Internet Time Service (ITS) allows users to synchronize computer clocks via the Internet. The time information provided by the service is directly traceable to UTC (NIST). The service responds to time requests from any Internet client in several formats including the DAYTIME, TIME, and NTP protocols. The NIST Internet Time Service uses multiple stratum-1 time servers.

Internet time code protocols are defined by a series of documents called Request for Comments, or RFCs. These documents are available on-line from several sites on the Internet. The protocols supported by the NIST Internet Time Service are:

Network Time Protocol (RFC-1305): The Network Time Protocol (NTP) is the most commonly used Internet time protocol, and the one that provides the best performance. Large computers and workstations often include NTP software with their operating systems. The client software runs continuously as a background task that periodically gets updates from one or more servers. The client software ignores responses from servers that appear to be sending the wrong time, and averages the results from those that appear to be correct.

Daytime Protocol (RFC-867): This protocol is widely used by small computers running MS-DOS and similar operating systems. The server listens on port 13, and responds to requests in either TCP/IP or UDP/IP formats. The standard does not specify an exact format for the Daytime Protocol, but requires that the time is sent using standard ASCII characters. NIST uses a time code format JJJJJ YR-MO-DA HH:MM:SS TT L H msADV UTC(NIST) OTM, where:

JJJJJ is the Modified Julian Date (MJD). The MJD has a starting point of midnight on Nov. 17, 1858.

YR-MO-DA is the date. It shows the last two digits of the year, the month, and the current day of month.

HH:MM:SS is the time in hours, minutes, and seconds. The time is always sent as Coordinated Universal Time (UTC).

TT is a two digit code (00 to 99) that indicates whether the United States is on Standard Time (ST) or Daylight Saving Time (DST).

L is a one-digit code that indicates whether a leap second will be added or subtracted at midnight on the last day of the current month. If the code is 0, no leap second will occur this month. If the code is 1, a positive leap second will be added at the end of the month.

H is a health digit that indicates the health of the server. If H=0, the server is operating properly. If H=1, then the server is operating properly but its time may be in error by up to 5 seconds.

msADV displays the number of milliseconds that NIST advances the time code to partially compensate for network delays. The advance is currently set to 50.0 milliseconds.

The label UTC(NIST) is contained in every time code. It indicates that you are receiving Coordinated Universal Time (UTC) from the National Institute of Standards and Technology (NIST).

OTM (on-time marker) is an asterisk (*). The time values sent by the time code refer to the arrival time of the OTM. In other words, if the time code says it is 12:45:45, this means it is 12:45:45 when the OTM arrives.

Time Protocol (RFC-868): It returns a 32-bit unformatted binary number that represents the time in UTC seconds since Jan. 1, 1900.

Figure 3:
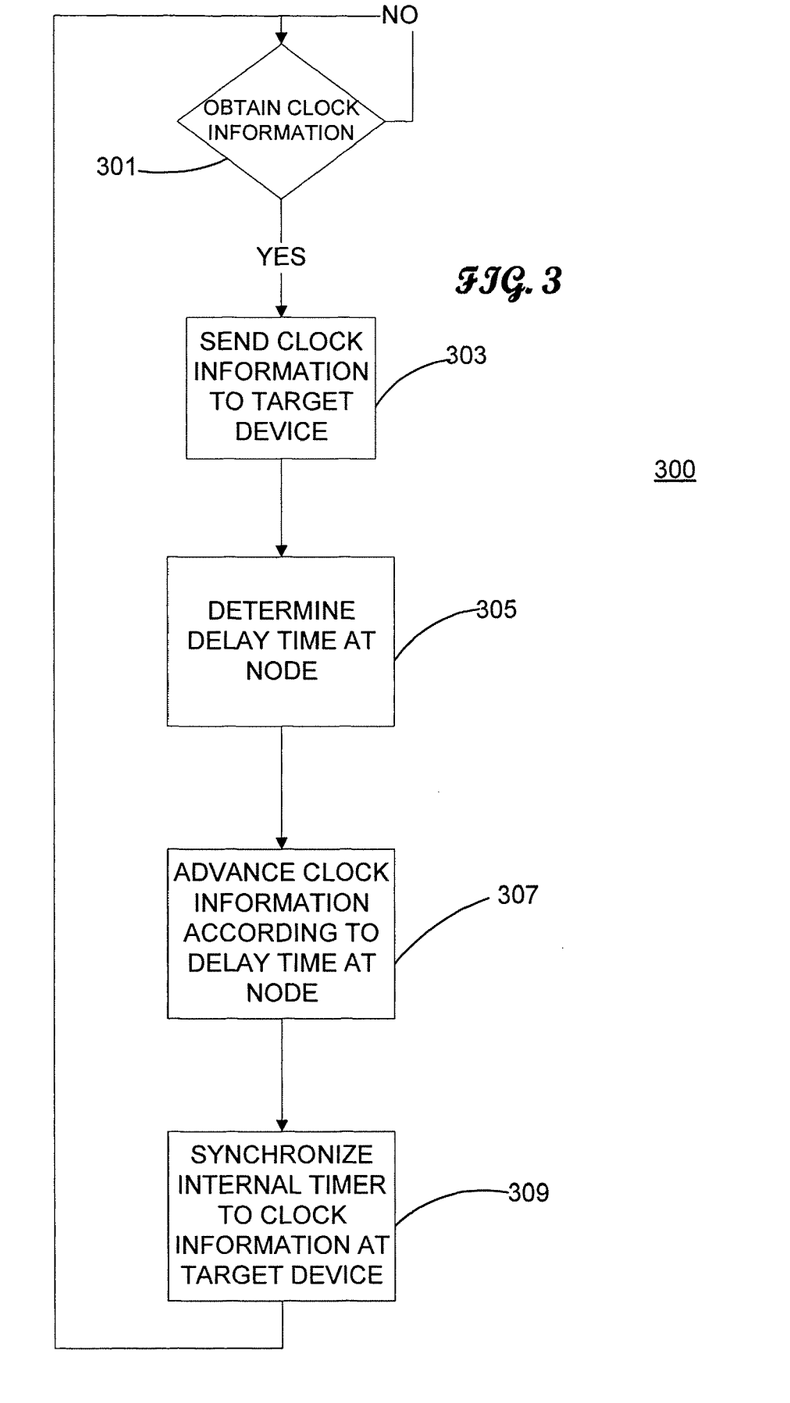
FIG. 3 shows a flow diagram for synchronizing an internal clock of a target device from clock information through a network in accordance with an embodiment of the invention.

FIG. 3 shows flow diagram 300 for synchronizing an internal clock (e.g., internal timer 605 as shown in FIG. 6) of a target device (e.g., target device 600) from clock information (e.g., adjusted time value 411 as shown in FIG. 4) through a network in accordance with an embodiment of the invention.

In step 301, clock device 101 acquires clock information from a received signal transmitted by a clock source. As previously discussed, the clock information may be obtained from a radio station or from a clock source connected through the Internet. Also, clock information may include different time parameters including the current time value. Clock device 101 extracts the clock information from a received signal and sends the clock information that is contained in a message to the target device in step 303.

Referring to FIG. 2, the message may traverse one or more nodes in the network in order for the message to reach the target node. Time delays typically occur in the network resulting from node process latency. Embodiments of the invention may support the determination of delay time at a node in step 305 in different manners, including utilizing measurement messages and determining a time delay from an internal timer at a node. If the transmission delay between nodes is sufficiently large (when compared with the desired time accuracy) a time stamp may also be included in a time update message, which indicates when the time update message is sent from one node to another node.

If the expected variance of the network delay is sufficiently small (in comparison with the desired time accuracy), system 200 may generate measurement messages between nodes before time update messages are sent from clock device 205 to a target device. The determined time delays may be stored at different nodes, so that time values may be advanced by an associated predetermined time delay. For example, an Internet Control Message Protocol (ICMP) may be used to measure response time between different nodes The particular type of ICMP message typically used to measure response time is the echo request (message type=8), which can be used to decide whether some destination node is reachable. The destination node receiving an echo request is supposed to respond with an echo reply (message type=0).

Alternatively, a node may maintain an internal timer to determine a time delay of the node latency when relaying a time update message. The internal timer typically has an accuracy that is small when compared to the desired time accuracy of the time update message.

In step 307, if the time delay is sufficiently large (when compared with the desired accuracy of the clock information), a node may advance the time value by an incremental amount (e.g., DELAY_1 as shown in field 407 of message 453 as shown in FIG. 4) in order to adjust to the time value to be within the desired time accuracy. In step 309, the target device (e.g., target device 600 as shown in FIG. 6) receives the target update message and synchronizes its internal clock (e.g., 605) to be consistent with the time value contained in the time update message.

FIG. 4 shows formats of time update messages 451-455 containing clock information that are transported through a network in accordance with an embodiment of the invention. (While not explicitly shown, time update messages 451-455 typically include source and destination address so that the messages can be routed by the network.) Referring to FIG. 2, time update messages 451-455 are descriptive of a scenario, in which clock device 205 updates the time of target device 217 through nodes 207 and 211. Clock device 205 generates time update message 451 with the current time value in field 403 (register value) in order to synchronize an internal clock of target device (DVD Recorder) 217. If the processing time of the signal from the clock source is sufficiently large (in comparison with the desired time accuracy) clock device 205 may advance the clock in accordance with an estimated processing time. Clock device 205 includes flag 401 to inform the network nodes and the target device that the message is for a real time update.

Time update message 451 is received by entry node 207 and is routed to transition/target node 211. With embodiments of the invention, because of the presence of flag 451 entry node 207 determines the time delay resulting from its node latency and advances the time value in field 407 of time update message 453 which is further routed to transition/target node 211.

Transition/target node 211 receives time update message 453 and determines the time delay resulting from its node latency and similarly advances the time value in field 411 of time update message 455, which is further routed to target device 217. As will be further discussed with FIG. 6, target device 217 synchronizes its internal clock in accordance with the time value contained in filed 411.

With the ZigBee protocol, Time Cluster is defined to handle time synchronization. Two separated flags indicate Master/Not Master and Synchronized/Not Synchronized. However, the functionality does not include clock functions such as time zone or daylight saving time.

Figure 5:
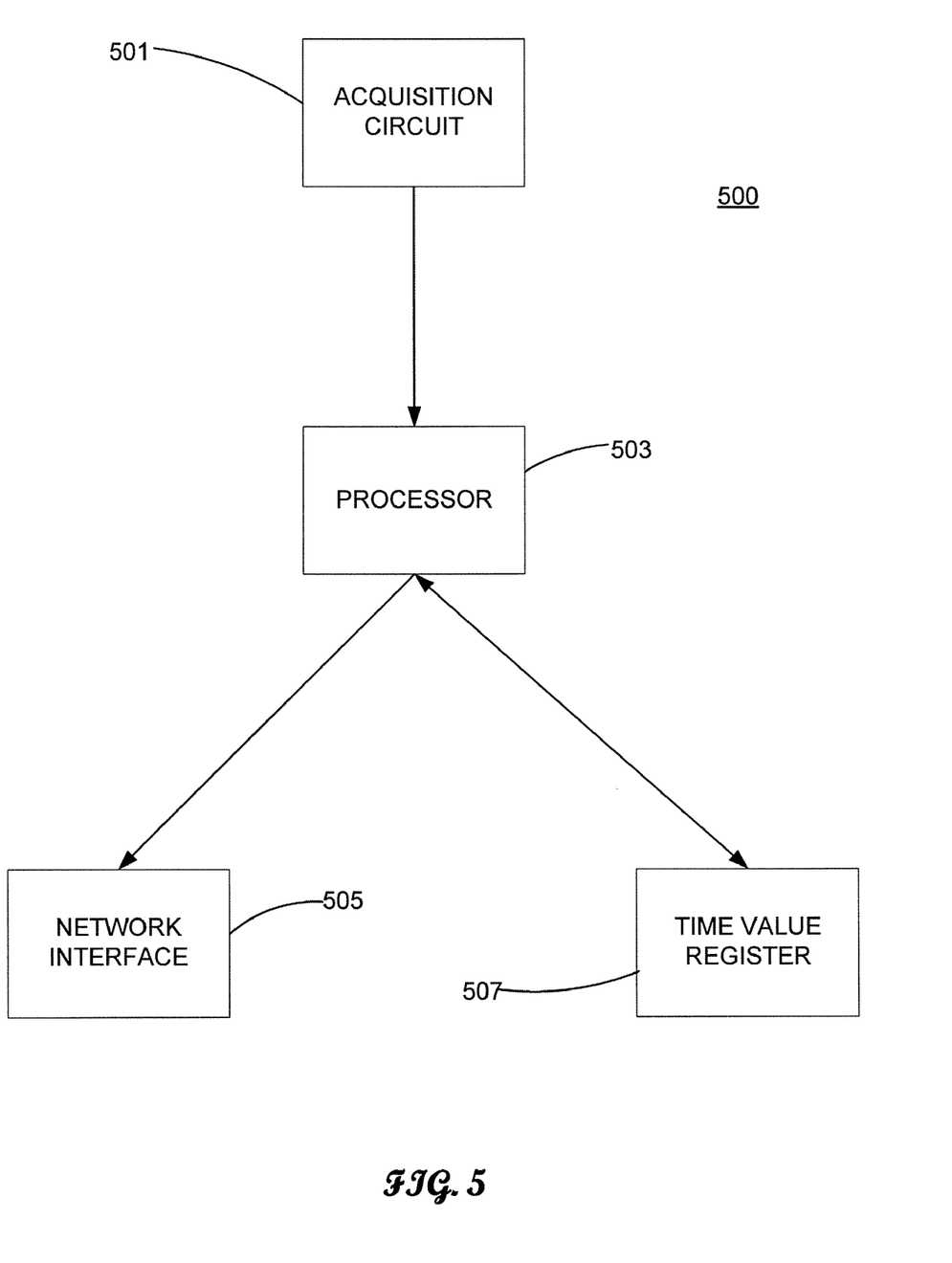
FIG. 5 shows an apparatus for a clock device in accordance with an embodiment of the invention.

FIG. 5 shows apparatus 500 for a clock device in accordance with an embodiment of the invention. Acquisition circuit acquires a signal from a clock source (e.g., radio station WWV 201 or internet source 203). Processor 503 extracts clock information from the acquired signal and may store the clock information in register 507 for subsequent access. Processor 503 sends a time update message containing the clock information to a target device through network interface 505.

With embodiments of the invention, processor 503 performs processing of the signal from the clock source within a time duration that is sufficiently smaller than the desired time accuracy. If that is not the case, processor 503 may compensate the time value for the time delay associated with processing the signal.

FIG. 6 shows architecture 600 for a target device that synchronizes internal clock 605 from clock information in accordance with an embodiment of the invention. Processor 603 receives a time update message with clock information from clock device 101 through network interface 601. Processor 603 synchronizes internal clock 605 with the time value (or the adjusted time value when adjusted by nodes in the network) through synchronization module 607. After synchronization, processor 603 may access internal clock 605 to obtain a current time and may display the current time on user interface 609 or control a controlled device (e.g., window blinds or a security system) through device controller 611 in accordance with the current time.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a clock device configured to:
        obtain a time value from a clock source; and
        send the time value to a target device over a network;
    a first node configured within the network and configured to:
        determine a first network time delay from the clock device to the first node; and
        adjust the time value by a first network time delay to obtain an adjusted time value; and
    a second node configured within the network and configured to:
        obtain the adjusted time value from the first node;
        determine a second network time delay from the first node to the second node;
        further adjust the adjusted time value by the second network time delay; and
        send the adjusted time value to a target device, wherein the target device is separate from the network.

2. The system of claim 1, further comprising:
    the target device configured to:
        obtain the adjusted time value; and
        synchronize an internal clock to the adjusted time value.

3. The method of claim 1, wherein the clock device is further configured to:
    maintain a list containing address of a plurality of target devices supporting a built-in real time clock; and
    when time synchronization occurs, send the time value to the target device over the network, the plurality of target devices including the target device.

4. A method comprising:
    (a) obtaining a time value from a clock source;
    (b) sending the time value to a target device over a network; and
    (c) determining, by a network entity within the network, an adjusted time value from the time value in accordance with a network delay.

5. The method of claim 4, further comprising:
    (d) synchronizing an internal clock to the adjusted time value.

6. The method of claim 4, further comprising:
    (d) including an indicator in a time update message that the time update message corresponds to a real time update, the time update message containing the time value.

7. The method of claim 4, further comprising:
    (d) further adjusting the adjusted time value in accordance with a further network delay.

8. The method of claim 7, further comprising:
    (e) repeating (d) until a time update message is received by the target device, the time update message containing the adjusted time value.

9. The method of claim 4, further comprising:
    (d) receiving another time value every predetermined time duration.

10. The method of claim 4, further comprising:
    (d) receiving another time value when an occurrence of a predetermined type of event is detected at the clock source.

11. The method of claim 4, further comprising:
    (d) receiving another time value from the clock source when instructed by the target device.

12. The method of claim 4, further comprising:
    (d) determining the network delay from a time stamp in a time update message containing the time value.

13. The method of claim 4, further comprising:
    (d) determining the network delay from a measurement message before sending the time value.

14. The method of claim 4, further comprising:
    (d) determining the network delay from an internal timer at a node in the network.

15. The method of claim 4, further comprising:
(d) compensating the time value for processing a signal from the clock source.

16. The method of claim 4, further comprising:
(d) converting the time value for a time zone that the target device is located.

17. The method of claim 8, further comprising:
(f) adjusting the adjusted time value only when an indicator is included in the time update message.

18. The method of claim 4, further comprising:
(d) receiving a clock update request from the target device over the network;
(e) in response to (d), obtaining a subsequent time value from the clock source; and
(f) sending the subsequent time value to the target device over the network.

19. The method of claim 4, further comprising:
(d) if the target device does not confirm reception of a time update, obtaining a subsequent time value from the clock source;
(e) sending the subsequent time value to the target device over the network; and
(f) repeating (d)-(e) until the target device confirms the reception of the time update.

20. The method of claim 4, further comprising:
(d) when a status change of daylight savings time occurs, obtaining a subsequent time value from the clock source;
(e) sending the subsequent time value to the target device over the network; and
(f) repeating (d)-(e) until the target device confirms a reception of the subsequent time value.

21. The method of claim 11, further comprising:
(e) initiating (d) when an event is detected at the target device.

22. The method of claim 21, wherein the event corresponds to a power outage.

23. The method of claim 21, wherein the event occurs when an update command is entered through the target device.

24. An apparatus comprising:
an acquisition circuit configured to receive a signal from a clock source;
a processor configured to process the signal to obtain a time value from the signal without maintaining a real-time clock and to compensate the time value for a time delay associated with processing the signal by the apparatus; and
a network interface configured to send the time value to a target device over a network.

25. The apparatus of claim 24, the acquisition circuit configured to receive the signal over a radio channel.

26. The apparatus of claim 24, the acquisition circuit configured to receive the signal over an Internet connection.

27. The apparatus of claim 24, the network interface configured to interface to a wired network.

28. The apparatus of claim 24, the network interface configured to interface to a wireless network.

* * * * *